Patented Feb. 24, 1925.

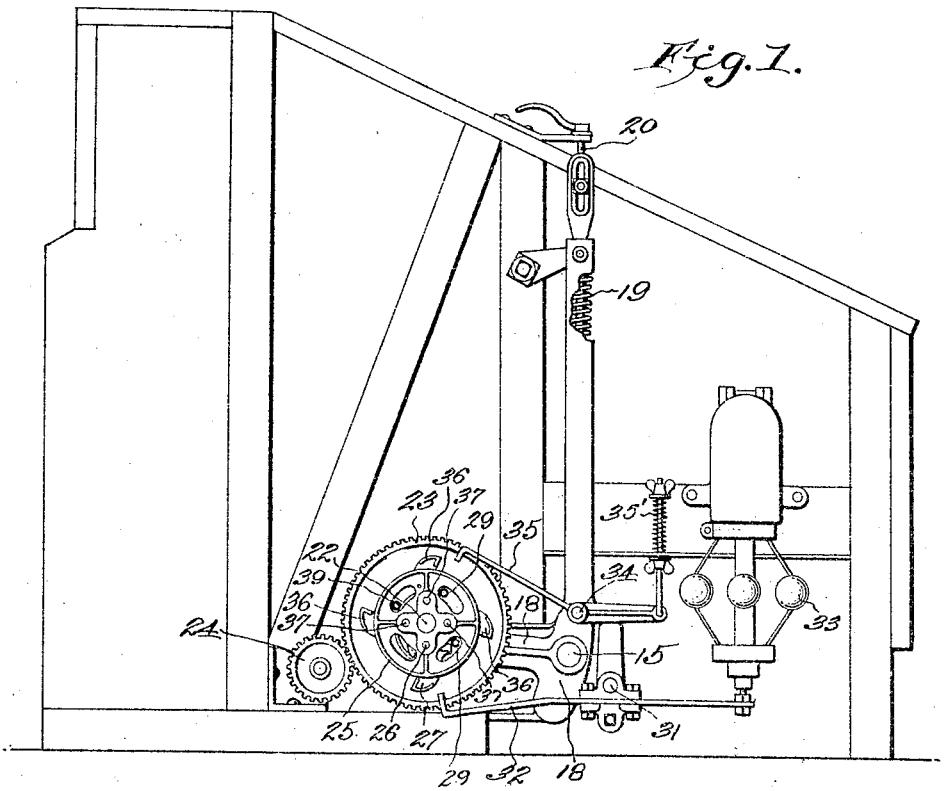

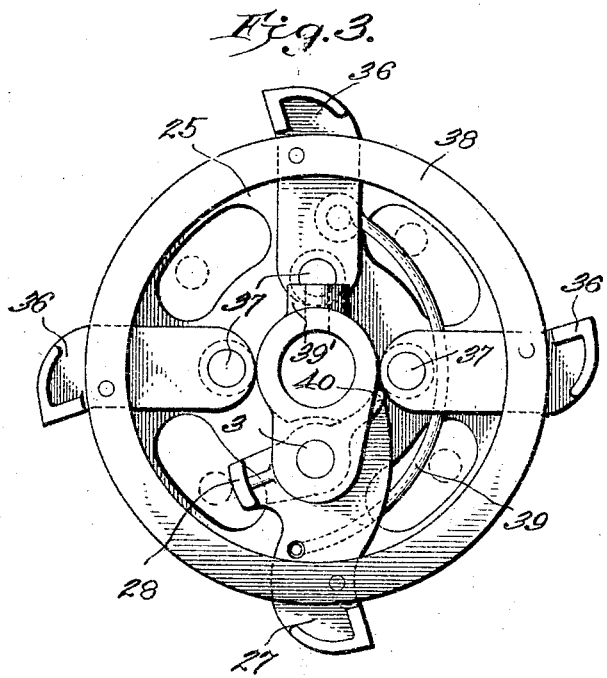

1,527,312

UNITED STATES PATENT OFFICE.

HERMAN KREUTZ, OF LAKE CITY, MINNESOTA.

GOVERNOR FOR FEEDERS.

Application filed October 16, 1923. Serial No. 668,929.

*To all whom it may concern:*

Be it known that I, HERMAN KREUTZ, a citizen of the United States, residing at Lake City, in the county of Wabasha and State of Minnesota, have invented new and useful Improvements in Governors for Feeders, of which the following is a specification.

This invention relates to improvements in feeding mechanisms for threshing machines and has for its primary object the provision of means for governing the feed, or automatically stopping the operation of the feed conveyor in the event of an overcharge in volume or a wet matted charge of material becoming choked from the feeding mechanism and for holding the feeding mechanism inactive until such charge is disposed of by the operation of the usual separator knives and retarder.

The present invention is an improvement upon patent numbered 985,183 granted February 28, 1911 to J. F. Langdon. One of the disadvantages of the construction disclosed in this patent resides in the fact that should the feed mechanism become choked just after the trip dog has passed the trip lever, an entire rotation of the conveyor shaft must occur before the dog can be engaged by said trip lever, so that the mechanism is subjected to severe strain and frequent damage before the feeding operation is stopped.

This disadvantage is overcome in the present invention by providing supplemental dogs which are connected to and actuate the main trip dog to release the gear from the shaft of the conveyor, so that irrespective of the relative positions of the main trip dog and the trip lever, the conveyor will be immediately stopped when a choke in the feed occurs.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation of a portion of a feeder with the invention applied thereto.

Figure 2 is a longitudinal sectional view through the feeder.

Figure 3 is an enlarged elevation of the governor mechanism.

Figure 4 is an edge view of Figure 3.

Figure 5 is an enlarged inner face view of the dog carrying disk.

Referring to the drawings in detail wherein like characters of reference denote corresponding parts, the reference character 10 indicates a portion of a feeder casing within which is mounted the usual band knives 11, rear knives 12, threshing cylinder 13 and retarder 14, the latter being mounted upon a floating shaft 15 which extends transversely of the casing 10 and which is carried by a bracket or yoke 18. This bracket or yoke is pivotally mounted upon one end of a shaft 16 upon which the threshing cylinder 13 is also mounted. The shaft 15 is yieldingly held in elevated position through the medium of a spring 19 whose tension may be regulated as at 20.

The rear conveyor roll 21 is mounted upon a shaft 22 and freely rotatable upon this shaft is a gear 23 which is engaged and driven by a pinion 24, the latter receiving motion from the driving mechanism of the feeder.

Secured upon the shaft 22 is a wheel or disk 25, while pivotally mounted upon the latter as shown at 26 is a dog 27. This dog carries a laterally extending lug 28 which is arranged in the path of any one of a plurality of rollers 29 which extend from the outer face of the gear 23. When the dog engages one of the rollers 29 the gear 23 will be locked to the shaft 22 so as to operate the feed conveyor 30.

Pivotally mounted as shown at 31 upon the yoke or bracket 18 is a trip lever 32 which is actuated by means of a governor 33 in the manner set forth having an operative connection with the shaft of the band knives 11, so that when the knives are operating, the governor 33 will lift the adjacent end of the lever 32. In addition, there is pivotally mounted as shown at 34 upon the yoke or bracket 18, a lever 35 which is normally held by means of a spring 35′ out of the path of the dog 27, and which, when the retarder shaft 15 is forced downward will be pivotally moved into the path of the said dog 27 so as to actuate the latter and release the gear 23.

All of the foregoing is present in the patent mentioned, but it will be apparent that if the downward movement of the retarder shaft 15 occurs immediately after the dog 27 passes the free end of the lever 35, an entire revolution of the shaft 22 must occur before the dog is again in position to be engaged by the lever.

In the present invention, there is pivotally mounted upon the disk or wheel 25, supplemental dogs 36, their pivotal connection being indicated at 37. The dogs 36 are connected by a frame which includes spaced rings 38, the said rings also serving to connect the dogs 36 with the dog 27, which may be referred to as the main dog in that it carries the lug 28 which serves to lock the gear 23 on the shaft 22 when the lug 28 engages the rollers 29. This main dog 27 is yieldingly held against pivotal movement in one direction by means of a spring 39 and its inner end 40 engages the hub of the wheel or disk 25 to limit the movement of the dog in an opposite direction.

As soon as a choking action of the feed occurs, the retarder shaft 15 will be depressed, whereupon the lever 35 will be moved pivotally to bring its free end into the path of either the dog 27 or any one of the supplemental dogs 36. In the first event, the dog 27 will be moved pivotally and the roller 29 of the gear 23 which is engaged by the lateral lug 28 of the said dog, will be released so as to release the gear 23. In the event that the lever 35 engages one of the supplemental dogs 36, the dog so engaged will be pivotally moved and through the connection of this dog with the main dog 27, the latter will also be pivotally moved and the gear 23 released as just described. Only a relatively short movement of the feed mechanism will thus occur after the feed has become sufficiently choked to depress the retarder 14.

The invention is susceptible of various changes in its form, proportions and minor details of construction and the right is herein reserved to make such changes as properly fall within the scope of the appended claims.

Having described the invention what is claimed is:—

1. In a feed governor for conveyors, the combination with a drive wheel loosely mounted upon the conveyor shaft, a feed mechanism including a floating retarder shaft, means including a spring actuated pivotally mounted main dog for clutching the drive wheel to the conveyor shaft, a trip member actuated by the actuation of the floating retarder shaft to move the trip member into the path of the dog and engage the latter to release the drive gear and pivotally mounted supplemental dogs operatively connected to the main dog and also adapted to be engaged by the trip member.

2. In a feed governor for conveyors, the combination with a drive wheel loosely mounted upon the conveyor shaft, a feed mechanism including a floating retarder shaft, means including a spring actuated main dog for clutching the drive wheel to the conveyor shaft, a trip member actuated by the actuation of the floating retarder shaft to move the trip member into the path of the dog and engage the latter to release the drive gear, supplemental dogs also adapted to be engaged by the trip member and means pivotally connecting the supplemental dogs and main dog, whereby engagement of the former will actuate the latter to release the drive gear.

3. In a feed governor for conveyors, the combination with a drive wheel loosely mounted upon the conveyor shaft, a feed mechanism including a floating retarder shaft, means including a spring actuated main dog for clutching the drive wheel to the conveyor shaft, a trip member actuated by the actuation of the floating retarder shaft to move the trip member into the path of the dog and engage the latter to release the drive gear, supplemental dogs also adapted to be engaged by the trip member and a frame pivotally connected to each of the dogs, whereby engagement of the supplemental dogs will actuate the main dog to release the drive gear.

4. In a feed governor for conveyors, the combination with a drive wheel loosely mounted upon the conveyor shaft, a feed mechanism including a floating retarder shaft, means including a spring actuated main dog for clutching the drive wheel to the conveyor shaft, a trip member actuated by the actuation of the floating retarder shaft to move the trip member into the path of the dog and engage the latter to release the drive gear, supplemental dogs also adapted to be engaged by the trip member and spaced rings pivotally connected to each of the dogs upon opposite sides thereof, whereby engagement of the supplemental dogs with the trip member will actuate the main dog to release the drive gear.

In testimony whereof I affix my signature.

HERMAN KREUTZ.